(12) United States Patent
Huang et al.

(10) Patent No.: US 11,309,678 B2
(45) Date of Patent: Apr. 19, 2022

(54) SPECTRUM AND POWER TUNABLE ASE LIGHT SOURCE

(71) Applicant: Molex, LLC, Lisle, IL (US)

(72) Inventors: Bichang Huang, Shenzhen (CN); Lifu Gong, San Jose, CA (US); Jun Yang, Zhuhai (CN)

(73) Assignee: MOLEX, LLC, Lisle, IL (US)

( * ) Notice: Subject to any disclaimer, the term of this patent is extended or adjusted under 35 U.S.C. 154(b) by 103 days.

(21) Appl. No.: 16/596,797

(22) Filed: Oct. 9, 2019

(65) Prior Publication Data
US 2021/0111530 A1    Apr. 15, 2021

(51) Int. Cl.
*H01S 3/067* (2006.01)
*H01S 3/094* (2006.01)
*H01S 3/10* (2006.01)
*H01S 3/106* (2006.01)

(52) U.S. Cl.
CPC ...... *H01S 3/06795* (2013.01); *H01S 3/06791* (2013.01); *H01S 3/094061* (2013.01); *H01S 3/094088* (2013.01); *H01S 3/1061* (2013.01); *H01S 3/10084* (2013.01); *H01S 2301/02* (2013.01)

(58) Field of Classification Search
CPC ............ H01S 3/06795; H01S 3/06758; H01S 3/1003; H01S 3/1061; H01S 3/06791; H01S 3/094088; H01S 3/094023; H01S 2301/02; H01S 3/094061; H01S 3/1001; H01S 3/10084–10092; H01S 2301/04; H01S 3/04003; H01S 5/5018; H01S 5/5045; H01S 5/5054–5063; H01S 3/2316; H01S 3/2325–235
See application file for complete search history.

(56) References Cited

U.S. PATENT DOCUMENTS 5,566,018 A * 10/1996 Lee ............ H01S 3/06795
359/341.1
5,636,053 A * 6/1997 Pan ............ G02F 1/13471
359/337

(Continued)

FOREIGN PATENT DOCUMENTS

FR    2775527 A1 *  9/1999  .......... H01S 3/1001
JP    H07273724 A    10/1995
(Continued)

OTHER PUBLICATIONS

Extended European Search Report received in EP Application No. 20200857.9, dated Mar. 1, 2021, 11 pages.

(Continued)

*Primary Examiner* — Joshua King

(57) ABSTRACT

An amplified spontaneous emission (ASE) light source and a method for using the ASE light source are provided. The ASE light source may include a seed stage light source for providing a light beam to be amplified. The apparatus may include a tunable element coupled to the seed stage light source configured for filtering a portion of the light beam from the seed stage light source. The apparatus may include a loopback circuit coupled to the tunable element, the loopback circuit comprising a booster stage element for amplifying light from the tunable element.

21 Claims, 7 Drawing Sheets

(56) References Cited

U.S. PATENT DOCUMENTS

| | | | | |
|---|---|---|---|---|
| 6,307,667 | B1* | 10/2001 | Liang | H01S 3/1302 359/337 |
| 6,603,596 | B2* | 8/2003 | Inagaki | H04B 10/2941 359/341.4 |
| 6,687,049 | B1* | 2/2004 | Sulhoff | H04B 10/296 359/341.4 |
| 7,139,120 | B2* | 11/2006 | Sugiya | H04B 10/2916 359/341.42 |
| 8,363,311 | B2* | 1/2013 | Qiao | H01S 3/0078 359/341.41 |
| 9,246,303 | B1* | 1/2016 | Rockwell | G01S 7/4814 |
| 10,840,925 | B1* | 11/2020 | Delfyett | H03L 7/20 |
| 2001/0024539 | A1* | 9/2001 | Atieh | H01S 3/06754 385/15 |
| 2002/0159135 | A1* | 10/2002 | Kelkar | H04B 10/2941 359/337.1 |
| 2004/0017603 | A1* | 1/2004 | Jay | H01S 3/06754 359/341.4 |
| 2005/0078358 | A1* | 4/2005 | Sato | H01S 3/06758 359/337.4 |
| 2005/0185259 | A1* | 8/2005 | Kim | H04B 10/294 359/341.1 |
| 2006/0077534 | A1* | 4/2006 | Griggs | H01S 3/06758 359/337 |
| 2006/0082865 | A1 | 4/2006 | Ahn et al. | |
| 2008/0278939 | A1* | 11/2008 | Endo | H01S 3/06758 362/231 |
| 2009/0219959 | A1* | 9/2009 | Murison | H01S 3/10084 372/25 |
| 2009/0290160 | A1* | 11/2009 | Taverner | G01J 3/10 356/419 |
| 2010/0091356 | A1* | 4/2010 | Huang | H04B 10/291 359/337.2 |
| 2011/0051143 | A1* | 3/2011 | Flanders | G01B 9/02091 356/451 |
| 2011/0085230 | A1* | 4/2011 | Rapp | H01S 3/06758 359/341.3 |
| 2011/0170110 | A1* | 7/2011 | Oigawa | H01S 3/1109 356/479 |
| 2011/0317726 | A1* | 12/2011 | Tamaoki | H01S 3/06779 372/25 |
| 2012/0263198 | A1* | 10/2012 | Oba | H01S 3/1001 372/6 |
| 2014/0185131 | A1* | 7/2014 | Dai | H01S 3/06758 359/337.1 |
| 2014/0254614 | A1* | 9/2014 | Nicholson | H01S 3/06754 372/3 |
| 2015/0180196 | A1* | 6/2015 | Wang | H04B 10/2941 359/341.3 |
| 2015/0318660 | A1* | 11/2015 | Oba | H01S 3/1001 372/6 |
| 2019/0288481 | A1* | 9/2019 | Sacks | H01S 3/10061 |

FOREIGN PATENT DOCUMENTS

| | | | |
|---|---|---|---|
| JP | H10294510 A | 11/1998 | |
| JP | 2000294860 A | 10/2000 | |
| JP | 2004200690 A | 7/2004 | |
| JP | 2009505378 A | 2/2009 | |
| JP | 2013504216 A | 2/2013 | |
| JP | 2015504612 A | 2/2015 | |
| WO | WO-2014101427 A1 * | 7/2014 | ......... H01S 3/06795 |

OTHER PUBLICATIONS

Hsu, "All-optical gain-clamped L-band erbium-doped fiber amplifier with two feedback-loop lasing wavelengths", Optical Engineering, vol. 44, No. 11, Nov. 2005, pp. 115001-1 to 115001-4.

Inoue, "Gain-clamped fiber amplifier with a short length of preamplification fiber", IEEE Photonics Technology Letters,, vol. 11, No. 9, Sep. 1999, pp. 1108-1110.

* cited by examiner

SPECTRUM AND POWER TUNABLE ASE LIGHT SOURCE

BACKGROUND

Field

The present disclosure relates to the field of light sources used in fiber optic systems, and more particularly, but not exclusively, to amplified spontaneous emission (ASE) light sources.

Background

Reliable and versatile light sources including laser devices, light emitting diodes (LEDs), ASE light sources, etc. are an integral part of fiber optic communication systems. In recent years, data centers and other users have placed ever greater demands for fiber optic communication systems. Developments such as reconfigurable optical add-drop multiplexer (ROADM) configurations have provided some flexibility with greater impacts on network performance and stability. Further, ROADM is increasingly colorless, directionless, and contention-less (CDC) with grid-less or flex grid design. In some cases, the complexity including configurations with a high number of add-drop filters have introduced undesirable oscillations into the devices. As more demands are placed on network devices, there is increasingly greater demand for improved devices that are capable of addressing the flexible design goals of network operators.

Accordingly, there is a need for improved flexible light sources to drive these communication systems.

SUMMARY

In an aspect of the disclosure, an amplified spontaneous emission (ASE) light source is provided. The light source may include a seed stage light source for providing a light beam to be amplified. The light source may include a tunable element coupled to the seed stage light source configured for filtering a portion of the light beam from the seed stage light source. The light source may include a loopback circuit coupled to the tunable element, the loopback circuit comprising a booster stage element for amplifying the filtered light beam from the tunable element.

In another aspect of the disclosure, a method is provided for generating light output at an amplified spontaneous emission (ASE) light source. The method may generate seed stage light using a medium configured for providing a light beam to be amplified. The method may include filtering the seed stage light beam at a tunable element configured to filter at least a portion of the seed stage light beam. The method may include amplifying the filtered light output of the tunable element at a loopback circuit that comprises a booster stage element.

DETAILED DESCRIPTION

Figure 1:
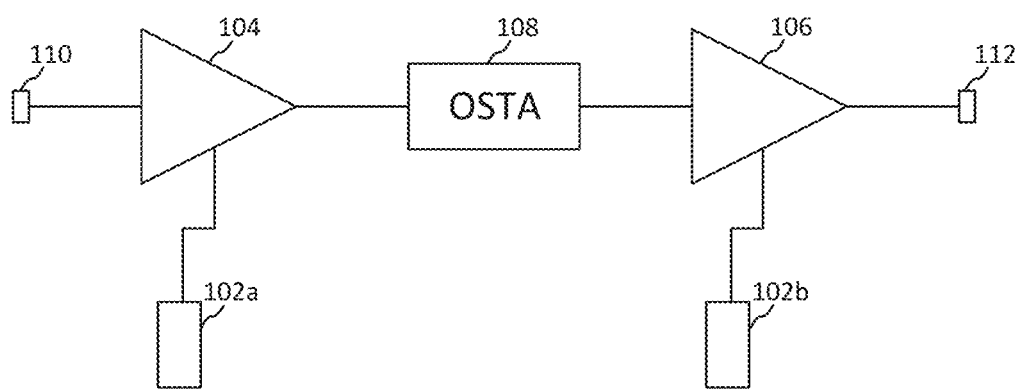
FIG. 1 is a diagram illustrating an exemplary light source using multiple pumping sources, in accordance with one or more aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. It will, however, be apparent to those skilled in the art that these concepts may be practiced without these specific details. In some instances, well known structures and components are shown in block diagram form in order to avoid obscuring such concepts.

Several aspects of the communication systems will now be presented with reference to various apparatuses and methods. These apparatuses and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), application-specific integrated circuits (ASIC), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), solid-state devices (e.g., solid-state drives or solid-state disks (SSD), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

The exemplary methods and apparatuses discussed infra are applicable to any of a variety of light sources such as amplified spontaneous emission (ASE) light sources. To simplify the discussion, the exemplary methods and apparatuses are discussed within the context of these example embodiments. One of ordinary skill in the art, however, would understand that the exemplary methods and apparatuses are applicable more generally to a variety of other light sources.

Disclosed herein are systems and methods for generating light output (or a light beam) at a light source using one or more pumps to excite amplifiers. The apparatus or module performing the methods may refer to a submodule of light source or the light source itself, or any portion thereof. Light sources may be an important component of fiber optic communication systems, providing the means for transmission of signals within the fiber optic communication system.

Operation of an ASE light source may include amplification of light signals. ASE light sources may include a gain medium or amplifier that may operate based on spontaneous emission of light and stimulated emission of light. The amplifier may be powered by pumps that provide energy to the material in the gain medium to create a population inversion in the material to cause the emissions of light. A population inversion is a condition of a system with a higher number of members in a higher state than a lower state. With respect to lasers and ASE light sources, a population inversion may refer to the state with a larger number of atoms in a higher energy state than a lower energy state. For example, fiber optics may be doped with a material (e.g., a rare earth material such as erbium) that is responsive to the pumped energy, such as a photonic pump energy. When the population inversion in created within the material, emissions of light may be produced.

More demands have been placed on light source devices as network operators desire higher levels of bandwidth and more flexibility in operating the networks. Some network schemes may include ROADM, for reconfigurable optical add/drop modules, that may be colorless, directionless, contention-less (CDC). As well, network operators may desire grid-less configurations. With the increasing demands placed on network systems and the components, there is an opportunity to provide more flexible ASE light sources to the fiber optic systems. As described below, ASE light source embodiments may be provided with exceptional functionality, compact size, low power consumption that may be preferred for ROADM or other deployments.

FIG. 1 is a diagram illustrating an exemplary ASE light source 100 using multiple pumping sources, in accordance with one or more aspects of the disclosure. ASE light source 100 may include pumps 102a, 102b for energizing the gain media, amplifiers 104, 106, respectively. The amplifiers 104, 106 may include a length of fiber optic and may be call a gain medium or laser medium, which may include or be doped with materials such as rare earth metals. For example, the gain medium may be a span of fiber that is doped with erbium (EDF). The pump energy transferred to the amplifier may be in the form of light, an electric current, or other forms including chemical, nuclear, etc. Amplifier 104 may be a gain medium configured to produce light from the pump energy. For example, spontaneous and stimulated emissions of light may be produced at the gain medium 104. In some embodiments, the amplifier output may be sensitive to the pump energy level so that pump energy level changes may dramatically change the gain shape of the amplifier. In such instances, undesirable oscillation within the light source 100 may result.

Reflector 110 may be an optional element of light source 100. The reflector 110 may be a mirror or other suitable component that allows light energy to be reflected or bounced back from the source, e.g., back to amplifier 104. In such instances, the reflector 110 may provide an additive signal strength to the amplifier 104.

Light source 100 may include an optical attenuator 108. In some embodiments, optical attenuator 108 may be an optical spectrum tunable attenuator (OSTA). Light output from amplifier 104 may be reduced at the optical attenuator 108. For example, in some embodiments amplifier 104 may produce full spectrum light output, encompassing all of the suitable light frequencies. The gain medium 104 may be selected based on the frequency response characteristics, including the spectrum output.

Light source 100 may include amplifier 106. Amplifier 106 may be a gain medium configured to amplify the light output from the OSTA 108 based on pumping action from pump 102b. The gain of amplifier 106 may be a function of and proportional to the amount of energy from pump 102b and the power of the output of OSTA 108. The light source 100 may include an element 112 for coupling to a network device. In some embodiments, the light source 100 may include a reflector or partial reflector (not shown) to provide feedback.

Laser 100 is shown with two pumps for powering the amplifiers 104, 106. Because the pumps require power and take up space, limiting the compactness of a laser, there are some instances where usage of only one pump is desirable. Such an embodiment using only one pump is presented below with respect to FIG. 2.

Figure 2:
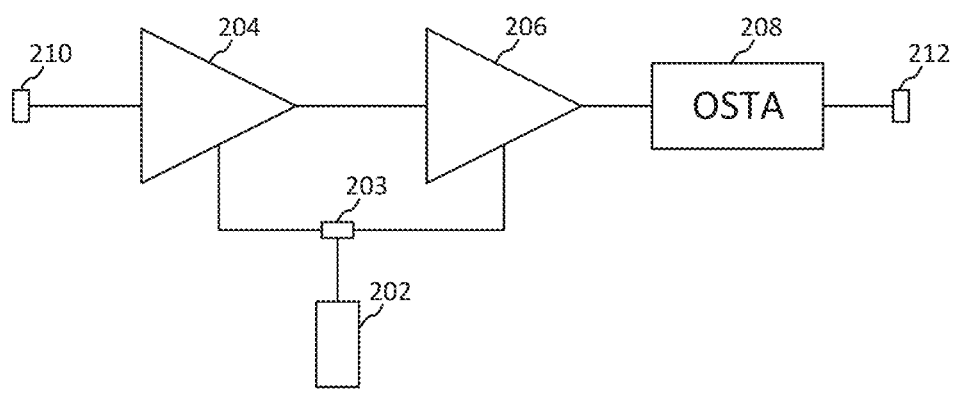
FIG. 2 is a diagram illustrating an exemplary light source using a single pumping source, in accordance with one or more aspects of the disclosure.

FIG. 2 is a diagram illustrating an exemplary light source using a single pumping source, in accordance with one or more aspects of the disclosure. Similar components from FIG. 1 may include similar functions and the description may be omitted for brevity.

Light source 200 may include pump 202 for energizing amplifiers 204, 206. In this embodiment, the pump provides power to both amplifiers so that a splitter 203 may be used to divide the power. In some embodiments, the power may be divided equally or based on system design. Amplifier 206 may amplify the output of amplifier 204. The output of Amplifier 206 may be a function of the energy 202 as provided via splitter 203 and the power from amplifier 204. In some embodiments, amplifier 204 may be full spectrum with the amplified full spectrum output amplified at amplifier 206. In comparison to the light source of FIG. 1, the amplifier 206 receives the unattenuated signal from amplifier 204. The signal from amplifier 206 is then filtered by the OSTA 208. The attenuator 208 may be configured to filter the light based on system design. The light source 200 may include an element 212 for coupling to a network device. In some embodiments, the light source 200 may include a reflector or partial reflector (not shown) to provide feedback.

Figure 3:
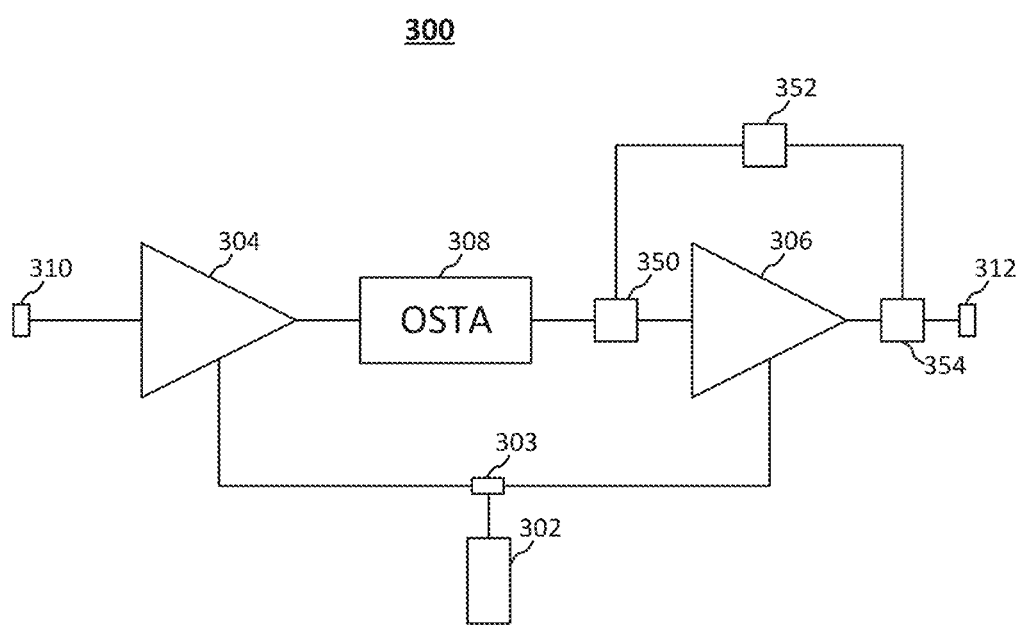
FIG. 3 is a diagram illustrating an exemplary light source using a single pumping source and a feedback loop to amplify the light source, in accordance with one or more aspects of the disclosure.

FIG. 3 is a diagram illustrating an exemplary ASE light source using a single pumping source and a feedback loop to amplify the light source, in accordance with one or more aspects of the disclosure. Similar components from FIG. 1 and FIG. 2 may include similar functions and the description may be omitted for brevity.

ASE light source 300 may include pump 302 for energizing amplifiers 304, 306. In this embodiment, the pump provides power to both amplifiers so that a splitter 303 may be used to divide the power. The pump 302 may be a constant energy source, using a constant electric current. Amplifier 304 may be a gain medium that spontaneously emits light when the pump energy creates a population inversion in the gain medium of the amplifier 304. The light energy may be filter or attenuated by attenuator 308. Amplifier 306 may be called a booster stage that amplifies the light from the OSTA 308, and further utilizes feedback to provide a desirable gain output. Amplifier 304 may be called a seed stage light source that may generate full spectrum (or full band) low power ASE seed light. Light source 300 may optionally include reflector 310 that may provide reflections of the signal from amplifier 304. The light source 300 may include an element 312 for coupling to a network device.

The components around amplifier 306 (elements 350, 352, 354) may be called a feedback loop, a loopback circuit, a ring oscillator, or resonator. For example, the feedback loop may produce coherent oscillation, in phase and in time with the input. The gain of the device 300 may be equal to the power input of the signal times the gain of the signal—with the gain generated within the feedback loop. The power output of the combined input signal and feedback may be proportional to the power of the pumping mechanism—which may describe the mean pump efficiency.

The feedback loop may include light in a clockwise mode and a counterclockwise mode. The gain of the feedback loop from element 350 to element 354 (left to right) may be equal to or proportional to the insertion loss from element 354 to element 350 (right to left). The signal may be proportional to the loss from element 350 to element 354 (left to right).

When the gain of the feedback loop is at unity (amplification exactly equals losses) the device 300 may operate at steady state. Losses may include light diffraction losses, coupling losses, etc. In some embodiments, the booster stage may maintain a constant gain. In some embodiments, the constant gain may be maintained regardless of the number of channels loaded at device 300. If there are spectrum or power errors, the errors may be fed back to adjust the attenuator 308.

The feedback loop elements may be configured as a tap 350, attenuator/splice 352, and filter 354. The tap 350 may be configured for combining the light from the attenuator 308, and attenuator 352. The tap 350 output may be provided to the amplifier 306. Attenuator/splicer 352 may filter or attenuate the light signal. Filter 354 may split a portion of the light back to the feedback loop. At least one of elements 350, 352, 354 may be implemented as a filter. The other two elements may be an attenuator, tap or isolator, etc. Because there is a filter (any one of elements 350, 352, 354) within the feedback loop, only the filtered light passes through the feedback loop to be amplified.

The optical spectrum tunable attenuator (OSTA) may be implemented using various technologies and operate either in a continuous spectrum tune or a wavelength channelized tune with wavelength channel in fixed grid or flexible grid or flexible grid setting. In another embodiment, the OSTA 308 may be implemented as a wavelength selective switch (WSS) device or a wavelength blocker (WB).

As illustrated, light source 300 may provide some advantages including supporting both spectrum tuning and power tuning. The embodiment 300 uses only one pump without the need for a second pump so that the same pump provides excitation energy to both amplifiers 304, 306. This may save energy and space leading to the benefit of lower cost and a more compact device size.

Figure 4:
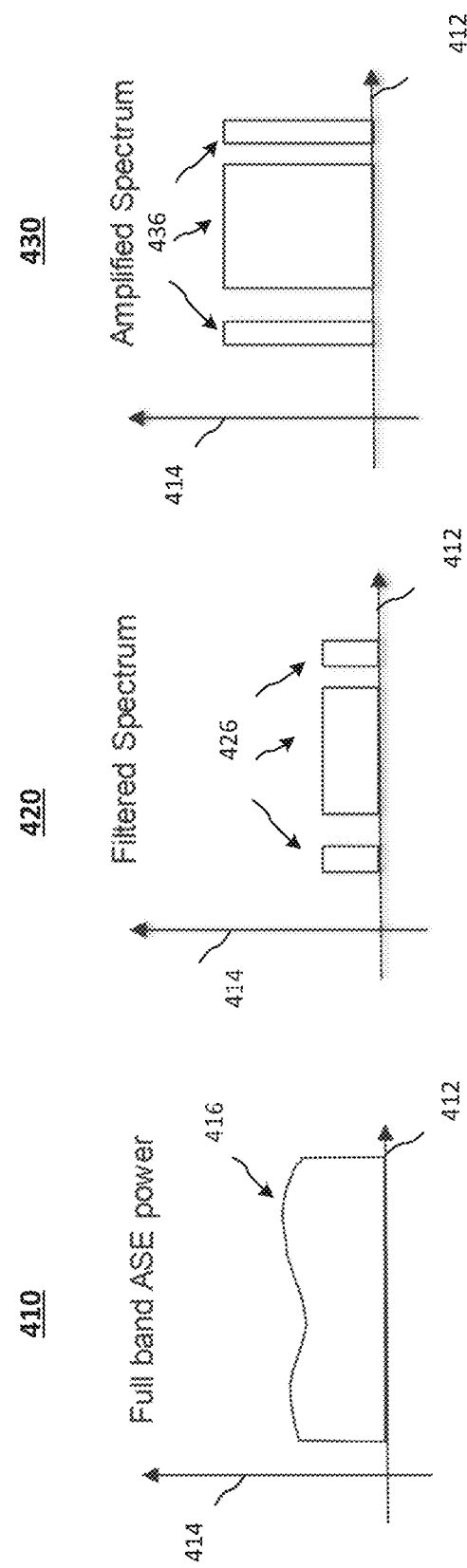
FIG. 4 includes chart illustrating example characteristics of signals passing through stages of the light source embodiments, e.g., of FIG. 3.

FIG. 4 includes charts illustrating example characteristics of signals passing through stages of the ASE light source embodiment of FIG. 3. Chart 410 shows a full spectrum signal at the output of the seed stage amplifier 304. The full spectrum output may enable flexible network design with flexibility for interfacing to a fiber optic system. The x-axis 412 is wavelength, and the y-axis 414 is signal power. The curve 416 of the spectrum output shows a full spectrum (or full band) signal across the desired bandwidth.

Chart 420 shows the signal from chart 410 after the signal is filtered through the OSTA 308. The OSTA 308 is frequency and power tunable, providing the ability to adjust both the power output and frequency selection. In the chart 420, the OSTA 308 is configured to select the three sets of wavelengths 426 (or frequency ranges). The signal is attenuated by the OSTA 308 to flatten the curve 426.

Chart 430 shows the signal from chart 420 after the signal has been amplified by the feedback loop. The amplifier network passes all the frequencies while increasing the signal strength. The gain may also be tunable. The signal is shown with uniform gain for the selected frequencies.

Figure 5:
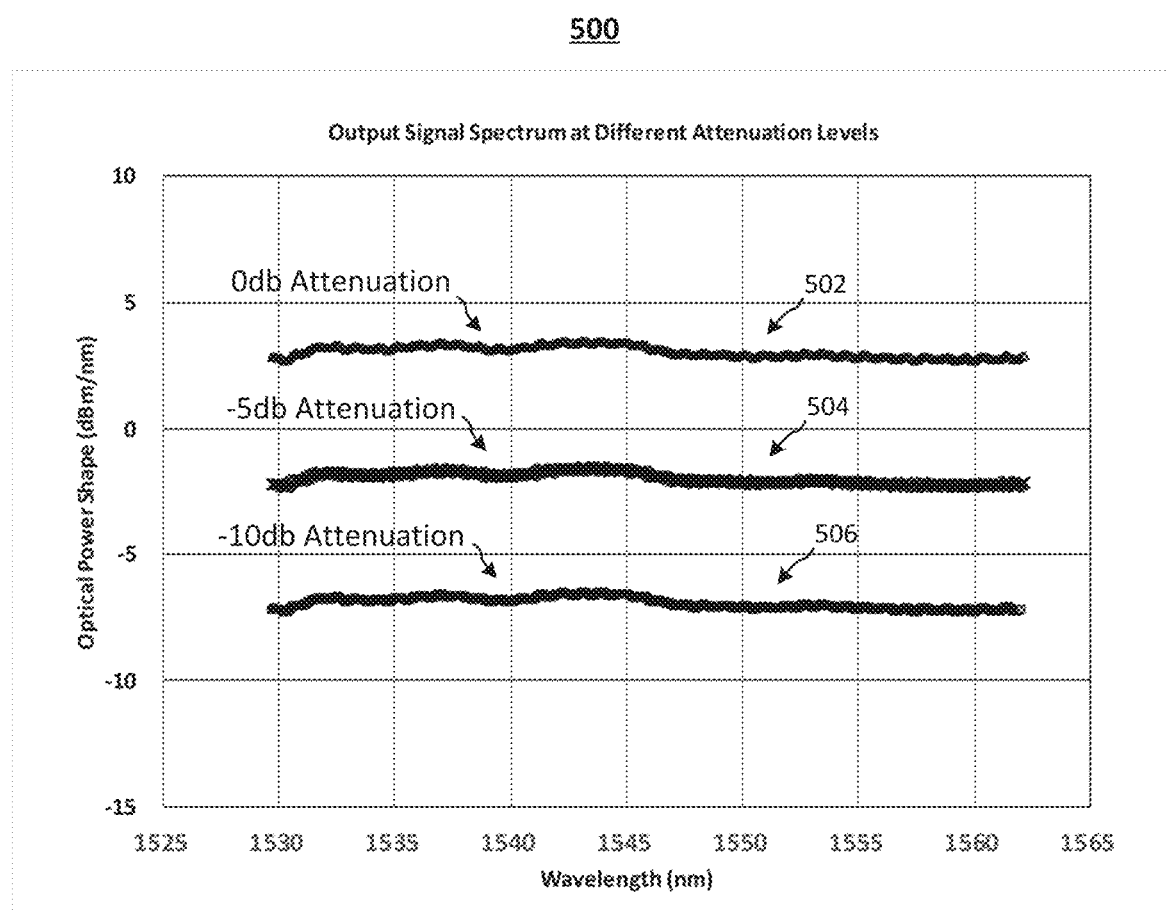
FIG. 5 is a chart illustrating example output signal spectrum at different attenuation levels of an embodiment of the disclosure, e.g., of FIG. 3.

FIG. 5 is a chart 500 illustrating example output signal spectrum at different attenuation levels of an embodiment of the disclosure. The example chart 500 may illustrate output of light source 300 of FIG. 3. The x-axis is light wavelength in nanometers (nm); the y-axis is optical power output (or shape) in decibel-milliwatts (dBm) per nm. When the OSTA is set to 0 db attenuation, the example embodiment shows a relatively flat power output curve 502 with the given OSTA attenuation. The curve 502 lies between zero and five dBm per nm. When the attenuation at the OSTA is set to −5 db, the power output curve 504 is shifted down as shown in curve 504. When the attenuation at the OSTA is set to −10 db, the power output curve 506 is shifted down as shown in curve 506. The curves 502, 504, 506 show the output at the OSTA is roughly flat with the attenuation output matching the attenuation setting at the OSTA.

Figure 6:
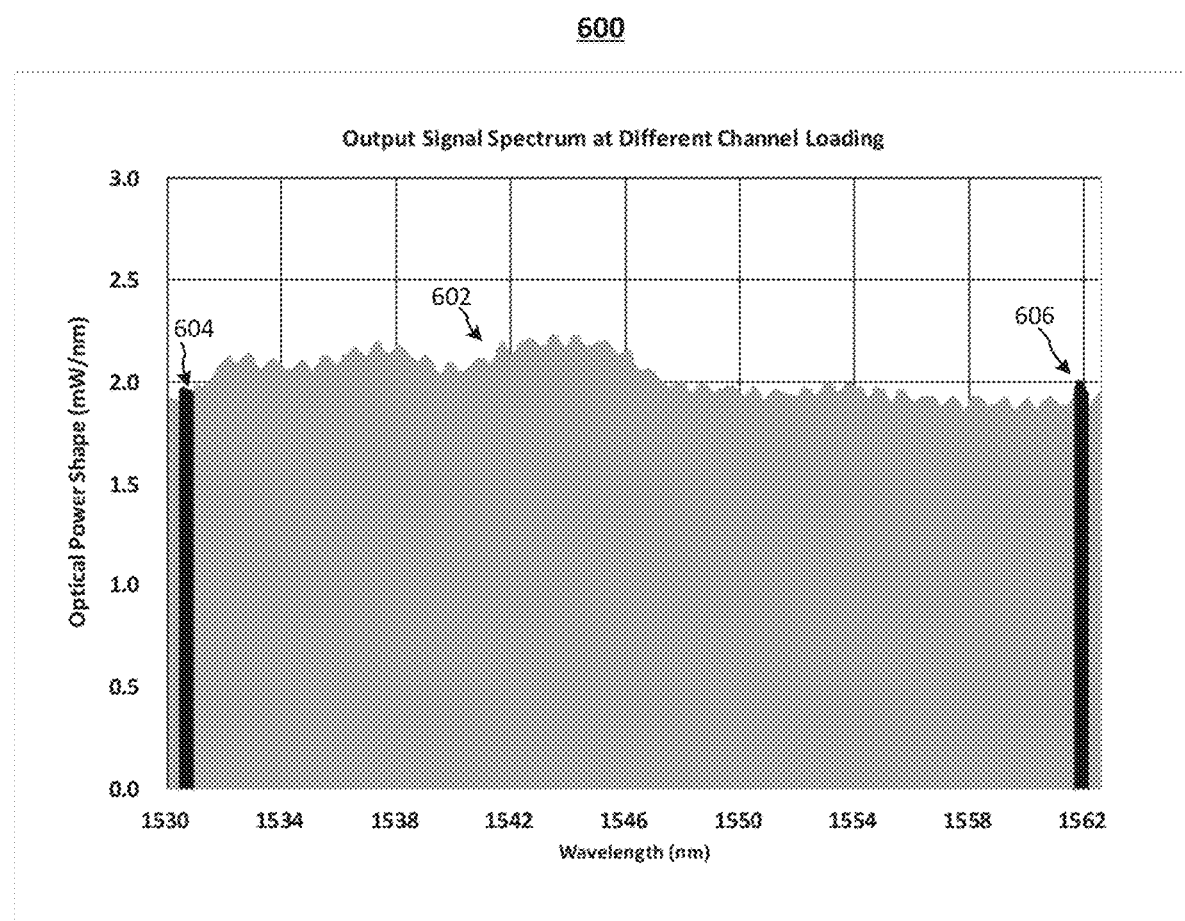
FIG. 6 is a chart illustrating example output signal spectrum at channel loading of an embodiment of the disclosure, e.g., of FIG. 3.

FIG. 6 is a chart 600 illustrating example output signal spectrum at different channel loadings of an embodiment of the disclosure. The example chart 600 may illustrate output of light source 300 of FIG. 3. The x-asix is light wavelength in nm; the y-axis is optical power output (or shape) in milliwatts (mW) per nm. When the device 300 has full channel loading, the output power curve 602 may be relatively flat with minor and major peaks on the chart 600 as shown. Curve 604 shows the power output with single channel loading at shorter wavelengths (e.g., at around 1531 nm). Curve 606 shows the power output with single channel loading at longer wavelengths (e.g., at around 1562 nm).

Figure 7:
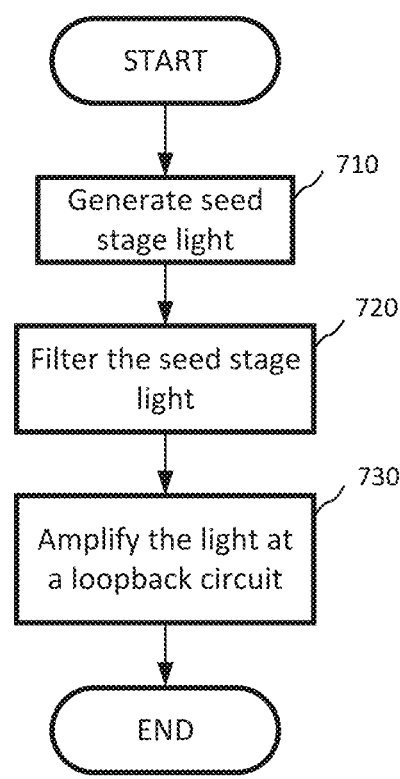
FIG. 7 is a flow chart illustrating an exemplary method for an amplified spontaneous emission light source, in accordance with one or more aspects of the disclosure.

FIG. 7 is a flow chart illustrating an exemplary method for an amplified spontaneous emission light source, in accordance with one or more aspects of the disclosure. For example, the method may illustrate the production and emission of light at an apparatus such light source 300 of FIG. 3.

At step 710, the method may generate seed stage light using a medium configured for spontaneous emission of light. For example, the method may include pumping energy to the seed stage and the booster stage element from single pump source via a splitter. The energy division between the seed stage and booster stage may be adjusted based on system design.

At step 720, the method may filter the seed stage light at a tunable element configured to filter at least a portion of the seed stage light. The tunable element may be a filter or other suitable element that can block frequencies of light. Once the light is filtered by the tunable element, the light enters the next stage at step 1030.

At step 730, the method may include amplifying the light output of the tunable element at a loopback circuit that comprises a booster stage element. The method may illustrate a continuous operation for the apparatus wherein the steps are continuously repeated. In other embodiments, the method may stop after some time.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An amplified spontaneous emission (ASE) light source comprising:
   a seed stage light source for providing a light beam to be amplified;
   a tunable element coupled to the seed stage light source configured for filtering a portion of the light beam and outputting a filtered light beam; and
   a loopback circuit coupled to the tunable element, and including (i) a booster stage element for amplifying the filtered light beam, (ii) a filter, coupled to an output of the booster stage element, that routes (a) a first part of the filtered light beam to the loopback circuit and (b) a second part of the filtered beam to an element external to the loopback circuit.

2. The amplified spontaneous emission light source of claim 1, further comprising:
   a splitter element;
   a pump energy source coupled to the seed stage light source and the booster stage element via the splitter element, which directs a first portion of an output of the pump energy source to the seed stage light source and a second portion of the output to the booster stage element.

3. The amplified spontaneous emission light source of claim 1, the loopback circuit further including a variable attenuator for modifying the light within the loopback circuit.

4. The amplified spontaneous emission light source of claim 1, the loopback circuit further including a tap coupler disposed between the tunable element and the booster stage element, and being configured to combine the filtered light from the tunable element and light from the loopback circuit.

5. The amplified spontaneous emission light source of claim 3, wherein the loopback circuit includes a second filter and is disposed between the tunable element and the booster stage element, the second filter being configured to block at least a portion of the light from the tunable element.

6. The amplified spontaneous emission light source of claim 1, wherein light within the loopback circuit comprises a clockwise mode and a counterclockwise mode.

7. The amplified spontaneous emission light source of claim 1, the tunable element including a wavelength selective switch (WSS).

8. The amplified spontaneous emission light source of claim 7, wherein the tunable element is configured to filter for user-defined wavelengths.

9. The amplified spontaneous emission light source of claim 1, wherein the seed stage light source is configured to produce full spectrum light output.

10. The amplified spontaneous emission light source of claim 1, further comprising a reflecting element coupled to the seed stage light source for reflecting the light beam toward the tunable element.

11. The amplified spontaneous emission light source of claim 2, the output being in the form of one of light and an electric current.

12. The amplified spontaneous emission light source of claim 2, wherein the pump energy source is configured to operate at a constant current input.

13. The amplified spontaneous emission light source of claim 2, wherein the splitter element is configured to direct more than half of the output to the booster stage element.

14. The amplified spontaneous emission light source of claim 4, the tap coupler being configured to pass a greater portion of signal power from the tunable element than from the loopback circuit.

15. The amplified spontaneous emission light source of claim 1, wherein the seed stage light source is based in part on spontaneous emissions of light.

16. A method for generating light output at an amplified spontaneous emission (ASE) light source, the method comprising:
   generating a seed stage light beam using a medium configured for providing a light beam to be amplified;
   filtering the seed stage light beam, at a tunable element configured to filter at least a portion of the seed stage light beam, to yield a filtered light beam;
   generating an amplified light beam by amplifying the filtered light beam at a loopback circuit that comprises a booster stage element;
   routing a first part of the amplified light beam to the loopback circuit; and
   routing a second part of the amplified light beam to an element external to the loopback circuit.

17. The method of claim 16, further comprising pumping energy to the seed stage and the booster stage element from a single pump source via a splitter coupled to the seed stage and the booster stage.

18. The method of claim 16, further comprising combining the filtered light beam and light from the loopback circuit at a tap coupler for amplification by the booster stage element.

19. The method of claim 16, further comprising
routing light in a clockwise direction around the loopback circuit, wherein the light is routed at a splitter disposed between the tunable element and booster stage element.

20. The method of claim 16, further comprising routing light in a counterclockwise direction around the loopback circuit, wherein the light is routed at a splitter coupled to the output of the booster stage element.

21. The amplified spontaneous emission light source of claim 1, the tunable element including a wavelength blocker.

* * * * *